United States Patent
Cui et al.

(10) Patent No.: US 11,979,828 B2
(45) Date of Patent: May 7, 2024

(54) INTERRUPTION MECHANISM FOR DEACTIVATED SECONDARY CELL MEASUREMENT

(71) Applicant: Apple Inc., Cupertino, CA (US)

(72) Inventors: Jie Cui, San Jose, CA (US); Yang Tang, San Jose, CA (US); Dawei Zhang, Saratoga, CA (US); Hong He, San Jose, CA (US); Manasa Raghavan, Sunnyvale, CA (US); Huaning Niu, San Jose, CA (US); Wenshu Zhang, San Diego, CA (US)

(73) Assignee: APPLE INC., Cupertino, CA (US)

( * ) Notice: Subject to any disclaimer, the term of this patent is extended or adjusted under 35 U.S.C. 154(b) by 230 days.

(21) Appl. No.: 17/498,375

(22) Filed: Oct. 11, 2021

(65) Prior Publication Data

US 2022/0132416 A1    Apr. 28, 2022

Related U.S. Application Data (60) Provisional application No. 63/104,426, filed on Oct. 22, 2020.

(51) Int. Cl.
*H04W 52/02* (2009.01)
*H04L 5/00* (2006.01)
*H04W 24/02* (2009.01)
*H04W 76/15* (2018.01)

(52) U.S. Cl.
CPC ......... *H04W 52/0212* (2013.01); *H04L 5/001* (2013.01); *H04W 24/02* (2013.01); *H04W 76/15* (2018.02)

(58) Field of Classification Search
CPC .... H04W 52/0212; H04W 24/02; H04L 5/001
See application file for complete search history.

(56) References Cited

U.S. PATENT DOCUMENTS

| | | | |
|---|---|---|---|
| 2004/0106430 A1* | 6/2004 | Schwarz | H04W 28/18 455/552.1 |
| 2019/0037338 A1* | 1/2019 | Edge | H04W 4/02 |
| 2021/0185553 A1* | 6/2021 | Shi | H04L 5/0098 |

OTHER PUBLICATIONS

"Requirements for support of radio resource management," Technical Specification Group Radio Access Network; NR, 3GPP TS 38.133 V16.5.0, Sep. 2020, 1608 pages.
"User Equipment (UE) radio access capabilities," Technical Specification Group Radio Access Network; NR, 3GPP TS 38.306 V16.2.0, Sep. 2020, 126 pages.
"Radio Resource Control (RRC) protocol specification," Technical Specification Group Radio Access Network; NR, 3GPP TS 38.331 V16.2.0, Sep. 2020, 921 pages.

* cited by examiner

*Primary Examiner* — Kevin C. Harper
(74) *Attorney, Agent, or Firm* — Kilpatrick Townsend & Stockton LLP (57) ABSTRACT

The present application relates to devices and components including apparatus, systems, and methods to provide an interruption mechanism for deactivated secondary cell measurement in new radio.

18 Claims, 6 Drawing Sheets

INTERRUPTION MECHANISM FOR DEACTIVATED SECONDARY CELL MEASUREMENT

CROSS-REFERENCES TO RELATED APPLICATIONS

This application claims priority to U.S. Provisional Patent Application No. 63/104,426 filed on Oct. 22, 2020, the disclosure of which is herein incorporated by reference in its entirety for all purposes.

BACKGROUND

Third Generation Partnership Project (3GPP) networks provide that a user equipment may connect to a plurality of base stations with a radio access network (RAN) to support the user equipment in the RAN. Secondary cells to which the user equipment may connect may be deactivated at times.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

Figure 1:
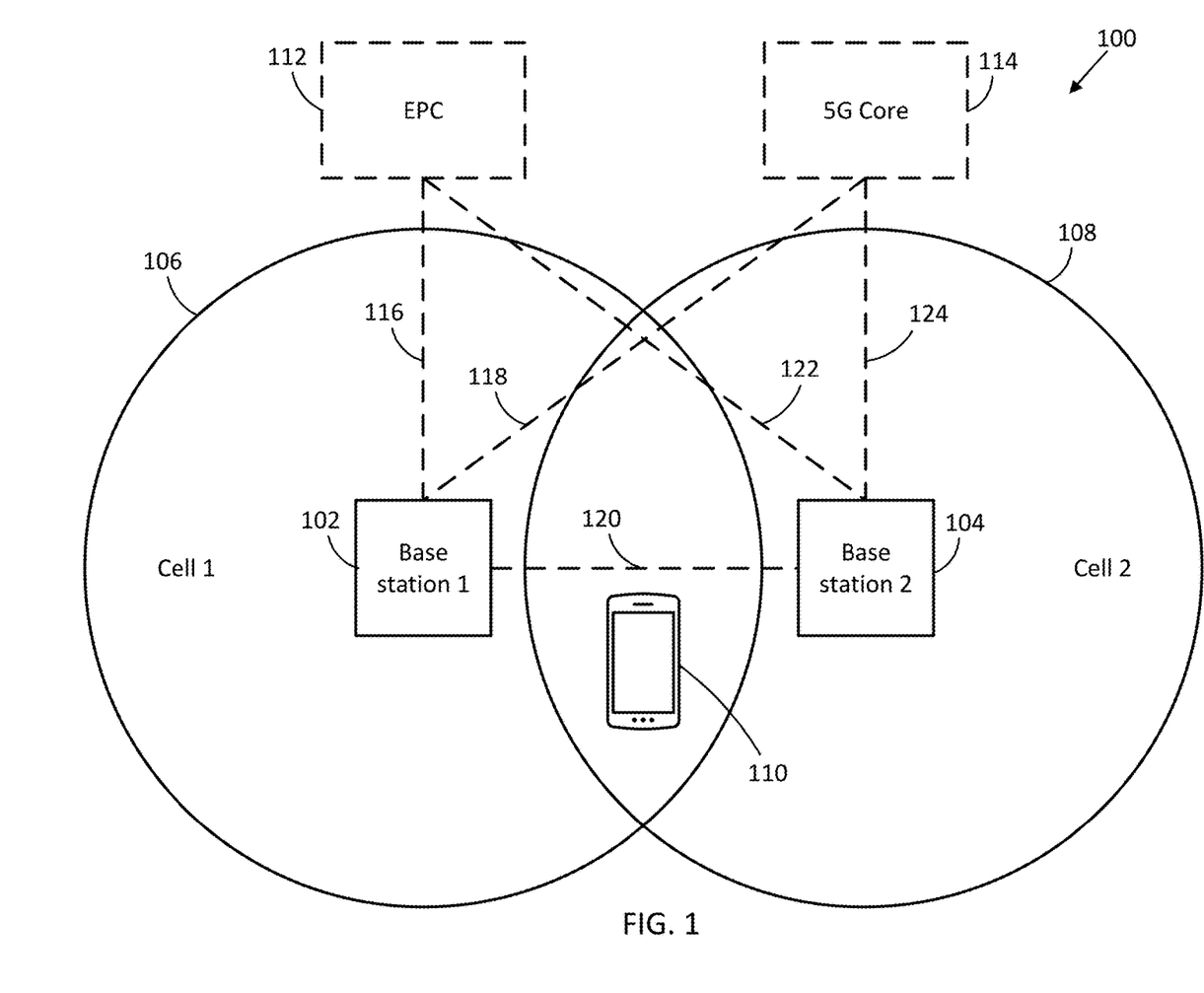
FIG. 1 illustrates an example network environment in accordance with some embodiments.

FIG. 1 illustrates an example network environment 100 in accordance with some embodiments. In particular, the network environment 100 illustrates a portion of a radio access network (RAN) that may support operation of one or more user equipments (UEs).

The network environment 100 may include one or more base stations (such as the next generation base station (gNB) 800 (FIG. 8), a Node B, an evolved Node B (eNB), and/or a next generation evolved Node B (ng-eNB). In the illustrated embodiment, the network environment 100 includes a first base station (BS) 102 and a second base station 104. The first base station 102 and the second base station 104 may be part of the RAN) (such as a third generation partnership project (3GPP) RAN). While two base stations are illustrated in the RAN in the network environment 100 in the illustrated embodiment, it should be understood that one or more base stations may be included in the RAN in other embodiments, where each of the base stations may have the features, or similar features, to the first base station 102 and the second base station 104. The first base station 102 and the second base station 104 may exchange transmissions with UEs, the transmissions may facilitate operations of the UEs. For example, the base stations (such as the first base station 102 and the second base station 104) of the RAN may be responsible for the definition of functions, requirements, and/or interfaces for the UEs. The RAN may be based on new wide band, multimode, flexible radio access. The base stations of the RAN may configure the UEs for use within the RAN.

The first base station 102 and the second base station 104 may be different types of base stations in different embodiments described further herein, where the different embodiments describe different network configurations. For example, the first base station 102 and the second base station 104 may both be fifth generation (5G) base stations in some embodiments, or one of the first base station 102 or the second base station 104 may be a 5G base station and the other of the first base station 102 or the second base station 104 may be a long term evolution (LTE) base station in some embodiments. Further, one of the first base station 102 or the second base station 104 may be in a master cell group (MCG) and the other of the first base station 102 or the second base station 104 may be in a secondary cell group (SCG) in some embodiments.

The network environment 100 may further include one or more cells. The network environment 100 illustrates a first cell 106 and a second cell 108 in the illustrated embodiment. The first cell 106 and the second cell 108 may be physical cells. The cells may be correspond to one or more base stations. In the illustrated environment, the first cell 106 may correspond to the first base station 102 and the second cell 108 may correspond to the second base station 104. In particular, the first base station 102 may manage the first cell 106 and the second base station 104 may manage the second cell 108. It should be understood that base stations may manage one or more cells in other embodiments.

Figure 7:
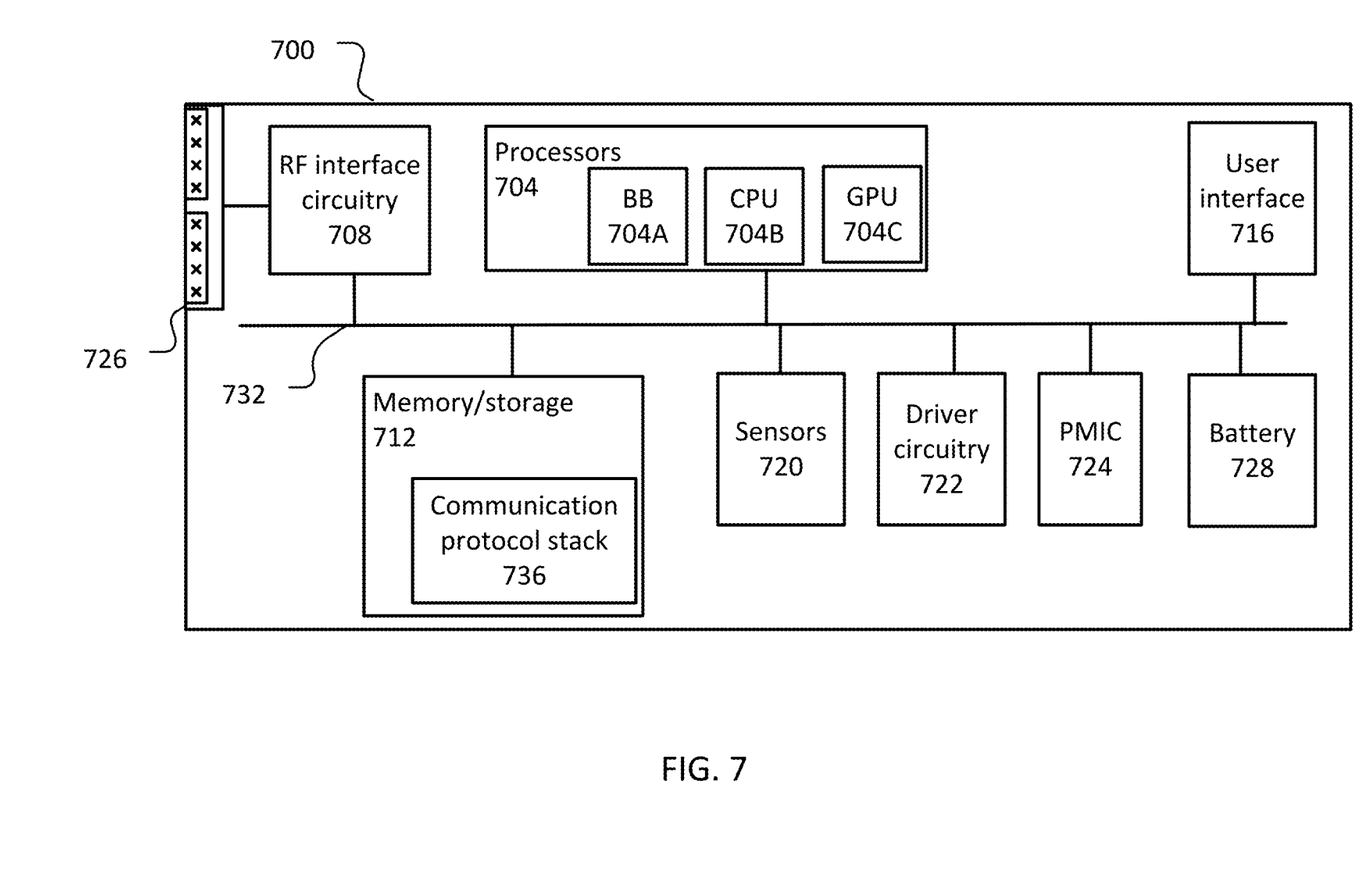
FIG. 7 illustrates an example UE in accordance with some embodiments.

The network environment 100 may further include a UE 110. The UE 110 may include one or more of the features of the UE 700 (FIG. 7). In the illustrated embodiment, the UE 110 may connect with the first base station 102 and the second base station 104, where the first cell 106 and the second cell 108 may serve the UE 110. The connection of the UE 110 with the first base station 102 and the second base station 104 may facilitate communication with the UE 110 within the RAN network. One of the first cell 106 or the second cell 108 may be a primary cell (PCell) for the UE 110 and the other of the first cell 106 or the second cell 108 may be a secondary cell (SCell) for the UE 110 in some embodiments.

The network environment 100 may further include an evolved packet core (EPC) 112 and/or a fifth generation (5G) core 114 in embodiments. The EPC 112 may include a mobility management entity (MME) and a serving gateway (S-GW). In embodiments that include the EPC 112, one of the first base station 102 or the second base station 104 may be connected to both the MME and the S-GW of the EPC 112, or one of the first base station 102 or the second base station 104 may be connected to the MME of the EPC 112 and the other of the first base station 102 and the second base station 104 may be connected to the S-GW of the EPC 112. The 5G core 114 may include an access and mobility management function (AMF) and a user plane function (UPF). In embodiments that include the 5G core 114, one of the first base station 102 or the second base station 104 may be connected to both the AMF and the UPF of the 5G core 114, or one of the first base station 102 or the second base station 104 may be connected to the AMP of the 5G core 114 and the other of the first base station 102 or the second base station 104 may be connected to the UPF of the 5G core 114.

The EPC 112 and/or the 5G core 114 may have one or more interfaces with the first base station 102 and/or the second base station 104 based on a network configuration. Further, one or more interfaces may exist between the first base station 102 and the second base station 104 based on a network configuration. In the illustrated embodiment, multiple possible interfaces are shown that may exist based on different network configurations. In particular, a first interface 116, a second interface 118, a third interface 120, a fourth interface 122, and a fifth interface 124 are illustrated, where the interfaces may be present based on the network configuration. The following embodiments describe some possible network configurations and interfaces that may present in the network configurations.

In some embodiments, the network of the network environment 100 may comprise a new radio (NR) standalone (NR-SA) network. The NR-SA network may include the first base station 102, the second base station 104, and the 5G core 114. In the NR-SA network configuration, both the first base station 102 and the second base station 104 may be connected to the 5G core 114. In particular, the first base station 102 may be connected to the 5G core 114 via the second interface 118 and the second base station 104 may be connected to the 5G core 114 via the fifth interface 124. The first base station 102 and the second base station 104 may both comprise 5G base stations, where the first cell 106 and the second cell 108 may comprise 5G cells. Each of the first base station 102 and the second base station 104 may provide control plane and user plane signaling in these embodiments. The UE 110 may establish connections with both the first base station 102 and the second base station 104. In these embodiments, the EPC 112, the first interface 116, and/or the fourth interface 122 may be omitted.

In some embodiments, the network of the network environment 100 may comprise an NR evolved universal terrestrial radio access network dual connectivity (NE-DC) network. The NE-DC network may include the first base station 102, the second base station 104, and the 5G core 114. In the NE-DC network configuration, one of the first base station 102 or the second base station 104 may establish a connection to the 5G core 114 for both the control plane and the user plane, whereas the other of the first base station 102 or the second base station 104 may establish a connection to the 5G core 114 for only the user plane. For clarity, the following description will assume the first base station 102 may establish the connection for both the control plane and the user plane, and the second base station 104 may establish the connection for the user plane. The first base station 102 may be connected to the 5G core 114 via the second interface 118, where the second interface 118 may provide both control plane and user plane connection for the first base station 102. The second base station 104 may be connected to the 5G core 114 via the fifth interface 124, where the fifth interface 124 may provide user plane connection for the second base station 104. The third interface 120 may provide a connection between the first base station 102 and the second base station 104, where the third interface 120 provides a control plane connection between the first base station 102 and the second base station 104. The first base station 102 may comprise a 5G base station and the second base station 104 may comprise an LTE base station, where the first cell 106 may comprise a 5G cell and the second cell 108 may comprise an LTE cell. The UE 110 may establish connections with both the first base station 102 and the second base station 104. In these embodiments, the EPC 112, the first interface 116, and/or the fourth interface 122 may be omitted.

In some embodiments, the network of the network environment 100 may comprise an evolved universal terrestrial radio access network NR dual connectivity (EN-DC) network. The EN-DC network may include the first base station 102, the second base station 104, and the EPC 112. In the EN-DC network configuration, one of the first base station 102 or the second base station 104 may establish a connection to the EPC 112 for both the control plane and the user plane, whereas the other of the first base station 102 or the second base station 104 may establish a connection to the EPC 112 for only the user plane. For clarity, the following description will assume the first base station 102 may establish the connection for both the control plane and the user plane, and the second base station 104 may establish the connection for the user plane. The first base station 102 may be connected to the EPC 112 via the first interface 116, where the first interface 116 may provide both control plane and user plane connection for the first base station 102. The second base station 104 may be connected to the EPC 112 via the fourth interface 122, where the fourth interface 122 may provide user plane connection for the second base station 104. The third interface 120 may provide a connection between the first base station 102 and the second base station 104, where the third interface 120 provides a control plane connection between the first base station 102 and the second base station 104. The first base station 102 may comprise an LTE base station and the second base station 104 may comprise a 5G base station, where the first cell 106 may comprise an LTE cell and the second cell 108 may comprise a 5G cell. The UE 110 may establish connections with both the first base station 102 and the second base station 104. In these embodiments, the 5G core 114, the second interface 118, and/or the fifth interface 124 may be omitted.

In some embodiments, the network of the network environment 100 may comprise a NR dual connectivity (NR-DC) network. The NR-DC network may include the first base station 102, the second base station 104, and the 5G core 114. In the NR-DC network configuration, one of the first base station 102 or the second base station 104 may establish a connection to the 5G core 114 for both the control plane and the user plane, whereas the other of the first base station 102 or the second base station 104 may establish a connection to the 5G core 114 for only the user plane. For clarity, the following description will assume the first base station 102 may establish the connection for both the control plane and the user plane, and the second base station 104 may establish the connection for the user plane. The first base station 102 may be connected to the 5G core 114 via the second interface 118, where the second interface 118 may provide both control plane and user plane connection for the first base station 102. The second base station 104 may be connected to the 5G core 114 via the fifth interface 124, where the fifth interface 124 may provide user plane connection for the second base station 104. The third interface 120 may provide a connection between the first base station 102 and the second base station 104, where the third interface 120 provides a control plane connection between the first base station 102 and the second base station 104. The first base station 102 and the second base station 104 may both comprise 5G base stations, where the first cell 106 and the second cell 108 may comprise 5G cells. The UE 110 may establish connections with both the first base station 102 and the second base station 104. In these embodiments, the EPC 112, the first interface 116, and/or the fourth interface 122.

While some example embodiments of EN-DC, NE-DC, NR-DC, and NR-SA networks are described, it should be understood that the networks are not intended to be limited to these embodiments. In particular, the references to EN-DC, NE-DC, NR-DC, and NR-SA networks may include any EN-DC, NE-DC, NR-DC, and NR-SA network configurations known to a person having ordinary skill in the art (PHOSITA).

In some embodiments, the first base station 102 and the second base station 104 may comprise master nodes or secondary nodes. For example, in the EN-DC, NE-DC, and NR-DC network configurations described above where one of the first base station 102 or the second base station 104 establishes a connection for the control plane to the EPC 112 or the 5G core 114 and the other of the first base station 102 or the second base station 104 does not establish a connection for the control plane to the EPC 112 or the 5G core 114, the base station that establishes the control plane connection may be the master node and the base station that does not establish the control plane connection may be the secondary node. The master node may be part of a master cell group and the secondary node may be part of a secondary cell group.

In establishing connections with the base stations, the UE may have one of the first cell 106 or the second cell 108 as a primary cell (PCell) and the other of the first cell 106 or the second cell 108 as a secondary cell (SCell). The PCell and the SCell may operate on different frequencies and/or different frequency ranges (FRs). For example, the first cell 106, when acting as the PCell, may operate on a primary frequency or a primary FR, and the second cell 108, when acting as the SCell, may operate on a secondary frequency or a secondary FR. The primary frequency or primary FR may be a different frequency/FR from the secondary frequency or secondary FR.

The PCell and the SCell may provide component carriers (CCs) for the UE 110. For example, the network may configure the UE 110 with CCs from both the PCell and the SCell. The CCs for the UE 110 may include CCs of a primary frequency or primary FR from the PCell and CCs of a secondary frequency or secondary FR from the SCell. The PCell may provide a primary CC (PCC) for the UE 110 and the SCell may provide a secondary CC (SCC) for the UE 110. The SCC may be activated or deactivated at different times.

Figure 2:
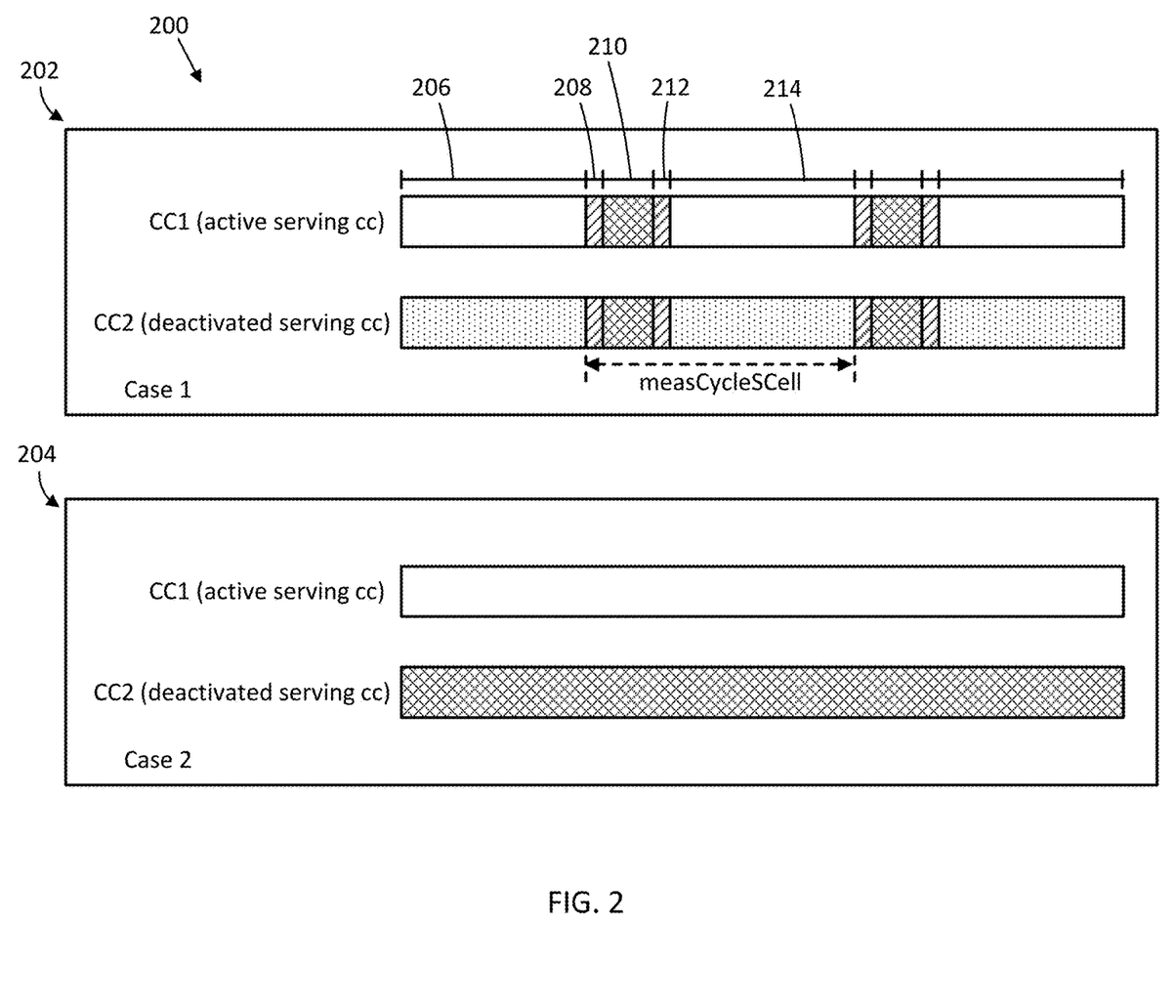
FIG. 2 illustrates example interruption configurations in accordance with some embodiments.

FIG. 2 illustrates example interruption configurations 200 in accordance with some embodiments. In particular, the interruption configurations 200 illustrated include a first interruption configuration 202 with interruption allowed and a second interruption configuration 204 without interruption allowed.

In NR standalone (SA), the interruption (caused by measurement of deactivated NR SCC) on NR active serving CCs was specified as (in TS 38.133 (3GPP Organizational Partners. (2020-09) 3$^{rd}$ Generation Partnership Project; Technical Specification Group Radio Access Network; NR; Requirements for support of radio resource management. (3GPP TS 38.133 V16.5.0)). For example, an interruption may be caused on NR active serving CCs by measurement of a deactivated NR SCC, where the NR active serving CCs and the deactivated NR SCC may be provided by NR base stations.

TS 38.133 Describes Interruptions During Measurements on Deactivated SCC as Follows. 8.2.2.2.3 of TS 38.133: Interruptions During Measurements on Deactivated SCC Interruptions on PCell due to measurements when an SCell is deactivated are allowed with up to 0.5% probability of missed acknowledge (ACK)/negative acknowledge (NACK) when the configured measCycleSCell is 640 ms or longer. The UE is only allowed to cause interruptions immediately before and immediately after a SMTC. For example, the UE may only be allowed to cause interruptions immediately before or after a synchronization signal/physical broadcast channel-based radio resource management measurement time configure (SMTC) window. Each interruption shall not exceed requirement in Table 8.2.2.2.2-1 of TS 38.133 if the PCell is not in the same band as the deactivated SCell. Each interruption shall not exceed requirement in Table 8.2.2.2.2-2 of TS 38.133 if the PCell is in the same band as the deactivated SCell.

Interruptions on activated SCells due to measurements when an SCell is deactivated are allowed with up to 0.5% probability of missed ACK/NACK when the configured measCycleSCell is 640 ms or longer. The UE is only allowed to cause interruptions immediately before and immediately after an SMTC. For example, the UE may only be allowed to cause interruptions immediately before or after a SMTC window. Each interruption shall not exceed requirement in Table 8.2.2.2.2-1 of TS 38.133 if the activated SCell is not in the same band as the deactivated SCell. Each interruption shall not exceed requirement in Table 8.2.2.2.2-2 of TS 38.133 if the activated SCell is in the same band as the deactivated SCell.

In legacy EN-DC, the interruption (caused by measurement of deactivated LTE SCC) on NR active serving CCs was specified as (in TS 38.133):

8.2.1.2.5.2 of TS 38.133: Interruptions During Measurements on Deactivated E-UTRAN SCC When one evolved universal terrestrial radio access (E-UTRA) SCell in MCG is deactivated, the UE is allowed due to measurements on the E-UTRA SCC with the deactivated E-UTRA SCell: an interruption on PSCell or any activated SCell with up to 0.5% probability of missed ACK/NACK when any of the configured measCycleSCell for the deactivated E-UTRA SCells is 640 ms or longer; an interruption on PSCell or any activated SCell with up to 0.5% probability of missed ACK/NACK regardless of the configured measCycleSCell for the deactivated E-UTRA SCells if indicated by the network using IE allowInterruptions.

The interruption requirement due to NR deactivated SCC measurement and interruption requirement due to LTE deactivated SCC measurement differs with respect to the supporting of allowInterruptions. This situation exists in NE-DC and NR-DC as well.

In summary, in EN-DC or NE-DC, the 0.5% interruption (to NR active serving CCs) caused by measurement on LTE deactivated SCC is only allowed when: measCycleSCell≥640 ms; measCycleSCell<640 ms but allowInterruptions='true'. In EN-DC, NE-DC, NR-SA and NR-DC, the 0.5% interruption (to NR active serving CCs) caused by measurement on NR deactivated SCC is only allowed when measCycleSCell≥640 ms.

The first interruption configuration 202 and the second interruption configuration 204 may both be for measurement periodicity of deactivated SCC (measCycleSCell) of greater than or equal to 640 milliseconds (ms). For the first interruption configuration 202, a UE may have interruption allowed and the UE may save power since the UE does not need to use radio frequency (RF) to cover CC2 (a deactivated SCC) outside the CC2 measurement occasion. For example, the UE may use RF that covers both CC1 (active serving CC) and CC2 at times, and may use RF that covers only CC1 at other times.

The first interruption configuration 202 has a first period 206, where the UE may use an RF that covers the CC1 (as indicated by rectangle with no fill for CC1) and does not cover CC2 (as indicated by the rectangle with dots for CC2). Not covering CC2 may use less power for the UE than covering both CC1 and CC2.

The first period 206 may conclude based on a first measurement of CC2. For example, a first measurement of CC2 may occur at the conclusion of the first period 206 in the first interruption configuration 202. The first measurement of the CC2 may initiate in a second period 208, where interruption occurs on both CC1 and CC2 (as indicated by the rectangles with the diagonal lines for CC1 and CC2). The interruption may be due to RF tuning/retuning or automatic gain control (AGC) settling. The AGC settling may apply when two CCs are intra-band. The interruption during the second period 208 may be for setting the UE to have RF that covers both CC1 and CC2 for the first measurement of CC2.

The second period 208 may be followed by a third period 210 where the UE may use an RF that covers both CC1 and CC2 (as indicated by the rectangles with cross-hatching for CC1 and CC2). During the second period 208 with the UE using an RF that covers both CC1 and CC2, the UE may perform a measurement on CC2.

The third period 210 may be followed by a fourth period 212 where another interruption occurs on both CC1 and CC2 (as indicated by the rectangles with the diagonal lines for CC1 and CC2). The interruption may be due to RF tuning/retuning or AGC setting. The interruption during the fourth period 212 may be for setting the UE to have an RF that covers CC1, but not CC2.

The fourth period 212 may be followed by a fifth period 214 where the UE may use an RF that covers the CC1 (as indicated by the rectangle with no fill for CC1), but not the CC2 (as indicated by the rectangle with dots for CC2). The fifth period 214 may occur after the first measurement of the CC2. A second measurement is shown in the first interruption configuration 202 after the fifth period 214, where the second measurement may have the interruptions and UE use an RF to cover both CC1 and CC2 as described for the first measurement.

For the second interruption configuration 204, the UE may not be allowed interruption caused by measurement on CC2. As the UE is not allowed interruption, the UE has to keep RF covering both CC1 (as indicated by the rectangle with no fill for CC1) and CC2 (as indicated by the rectangle with cross-hatching for CC2). The UE having to keep the RF to cover both CC1 and CC2 in the second interruption configuration 204 may consume more energy than the first interruption configuration 202 where interruption is allowed.

The indication and UE capability on LTE radio access technology (RAT) may need to be also extended to NR deactivated SCC measurement: per-UE indication between serving cell and UE for all NR operation modes; per-RAT indication between serving cell and UE for EN-DC and NE-DC. In particular, the introduction of NR deactivated SCC measurement may present issues that are to be addressed. How to interpret the different indication between two RATs may be an issue to be addressed. For the UE who support per-FR measurement gap (MG) capability, some exception cases may need to be added as well. Similar as LTE, two indications may be considered: (1) UE capability of whether it can benefit from reduced power consumption by allowing interruption for measCycleSCell<640 ms (indication from UE to network); (2) network indication to allow UE have interruption for measCycleSCell<640 ms (indication from network to UE).

Figure 3:
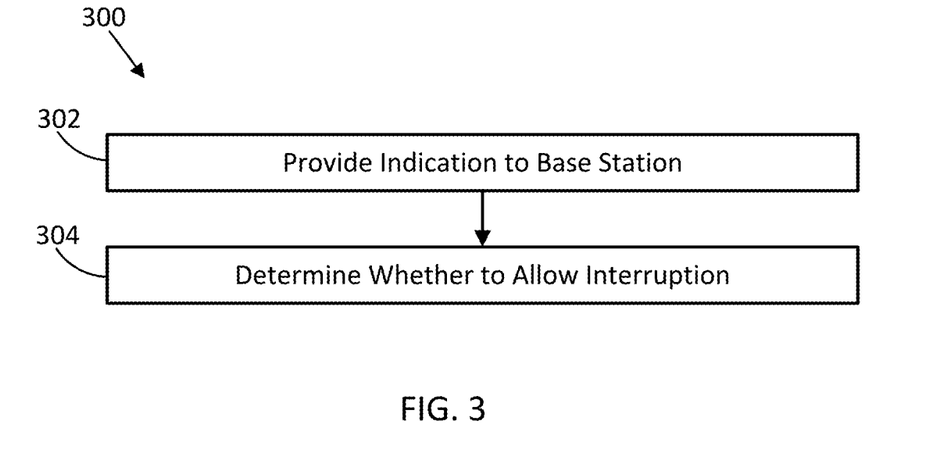
FIG. 3 illustrates an example procedure related to allowing interruption due to deactivated NR SCC measurement in accordance with some embodiments.

FIG. 3 illustrates an example procedure 300 related to allowing interruption due to deactivated NR SCC measurement in accordance with some embodiments. In particular, the procedure 300 may be performed by a UE (such as the UE 110 (FIG. 1)) to facilitate determination of whether the UE can be allowed interruption due to deactivated NR SCC measurement for measCycleScell less than 640 ms.

The procedure 300 may include per-UE indication between UE and a network. For example, the procedure 300 may allow for per-UE indication between the UE and an EN-DC network, an NE-DC network, an NR-DC network, or an NR SA network (such as the EN-DC network, the NE-DC network, the NR-DC network, or the NR SA network described in relation to the network environment 100 (FIG. 1)).

The indication of UE capability on whether it can benefit from reduced power consumption by allowing interruption due to deactivated NR SCC measurement for measCycleSCell<640 ms. In particular, the procedure 300 may include providing an indication of UE capability of whether the UE can benefit from power consumption by allowing interruption due to deactivated NR SCC measurement for measCycleSCell less than 640 ms. The indication may be per-UE indication between PCell and UE for all NR operation modes. For example, the indication may be a per-UE indication provided by a UE to a PCell in the EN-DC network, the NE-DC network, the NR-DC network, or the NR-SA network. In EN-DC, UE may indicate this capability via LTE RRC to LTE PCell (extend the legacy capability signaling to support NR deactivated SCC measurement). For example, in the EN-DC network, the UE may provide the indication of the UE capability of whether the UE can benefit from power consumption by allowing interruption due to deactivated NR SCC measurement via LTE radio resource control (RRC) signaling to an LTE PCell. In NE-DC, NR-DC and NR-SA, UE may indicate this capability via NR RRC to NR PCell. For example, in the NE-DC network, the NR-DC network, and the NR-SA network, the UE may provide the indication of the UE capability of whether the UE can benefit from power consumption by allowing interruption due to deactivated NR SCC measurement via NR RRC signaling to an NR PCell.

The network indication to allow UE have interruption due to deactivated NR SCC measurement for measCycleSCell<640 ms. For example, the network may provide an indication to the UE indicating whether the UE is allowed to have interruption due to deactivated NR SCC measurement for measCycleSCell less than 640 ms. The network indication may be a per-UE indication between PCell and UE for all NR operation modes. For example, the indication may be a per-UE indication provided by a PCell to a UE in the EN-DC network, the NE-DC network, the NR-DC network, or the NR-SA network. In EN-DC, LTE PCell may indicate this signaling to UE via LTE RRC (extend the existing indication signaling to support NR deactivated SCC measurement). For example, in the EN-DC network, the LTE PCell may provide the indication of whether the UE is allowed to have the interruption via LTE RRC signaling to the UE. In NE-DC, NR-DC and NR-SA, NR PCell may indicate this signaling to UE via NR RRC. For example, in the NE-DC network, the NR-DC network, and the NR-SA network, the NR PCell may provide the indication of whether the UE is allowed to have the interruption via NR RRC signaling to the UE.

The procedure 300 may include providing an indication to a base station in 302. In particular, the UE may provide the indication to a base station (such as the first base station 102 (FIG. 1) or the second base station 104 (FIG. 1)) of a RAN. The first indication may be a per-UE indication. The indication may be an indication of whether the UE can reduce power consumption by allowing interruption due to deactivated NR SCC measurement for a measCycleSCell that is less than 640 ms.

In some embodiments, the base station may be an LTE base station and the indication may be provided to the LTE base station by LTE RRC signaling. Further, the LTE base station may be a master node or a secondary node of an EN-DC network (such as the EN-DC network described in relation to the network environment 100).

In other embodiments, the base station may be an NR base station and the indication may be provided to the NR base station by NR RRC signaling. Further, the NR base station may be a master node or a secondary node of an NE-DC network (such as the NE-DC network described in relation to the network environment 100), an NR-DC network (such as the NR-DC network described in relation to the network environment 100), or an NR-SA network (such as the NR-SA network described in relation to the network environment 100).

The procedure 300 may include determining whether to allow interruption in 304. In particular, the UE may determine whether to allow interruption due to deactivated NR SCC measurement for a measCycleSCell that is less than 640 ms based on an indication received from a base station. The indication provided by the base station may indicate whether the UE is allowed the interruption. The indication may be a per-UE indication. The UE may determine whether to allow the interruption based on the indication received from the base station.

In some embodiments, the base station may be an LTE base station and the indication may be provided by LTE RRC signaling. Further, the LTE base station may be a master node or a secondary node of the EN-DC network.

In other embodiments, the base station may be an NR base station and the indication may be provided by NR RRC signaling. Further, the NR base station may be a master node or a secondary node of an NE-DC network (such as the NE-DC network described in relation to the network environment 100), an NR-DC network (such as the NR-DC network described in relation to the network environment 100), or an NR-SA network (such as the NR-SA network described in relation to the network environment 100).

Figure 4:
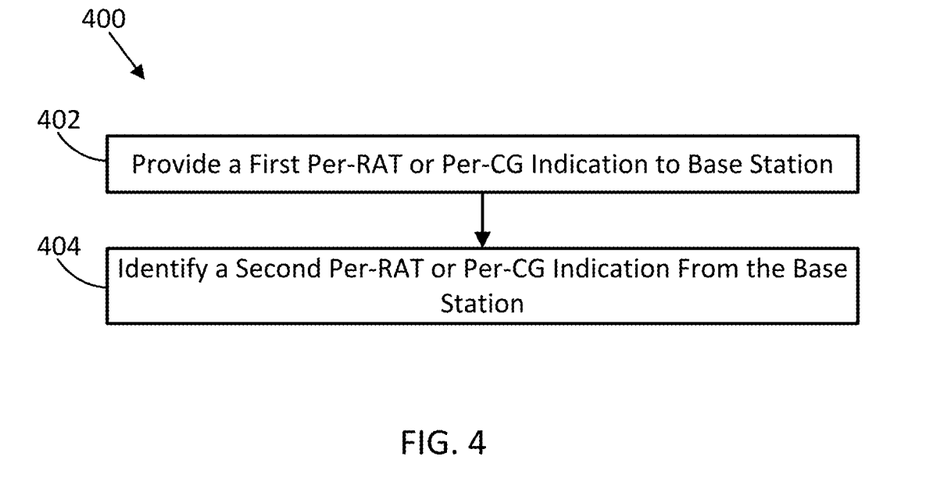
FIG. 4 illustrates another example procedure related to allowing interruption due to deactivated NR SCC measurement in accordance with some embodiments.

FIG. 4 illustrates another example procedure 400 related to allowing interruption due to deactivated NR SCC measurement in accordance with some embodiments. In particular, the procedure 400 may be performed by a UE (such as the UE 110 (FIG. 1)) to facilitate determination of whether the UE can be allowed interruption due to deactivated NR SCC measurement for measCycleScell less than 640 ms.

The procedure 400 may include per-RAT or per-CG indication between UE and a network. For example, the procedure 300 may allow for per-RAT or per-CG indication between the UE and an EN-DC network, an NE-DC network, an NR-DC network, or an NR SA network (such as the EN-DC network, the NE-DC network, the NR-DC network, or the NR SA network described in relation to the network environment 100 (FIG. 1)). For per-RAT indication, the indication may be indicated for the RAT of the deactivated NR SCC (such as the whether the base station providing the NR SCC is connected to an EPC (such as the EPC 112 (FIG. 1)) or a 5G core (such as the 5G core 114 (FIG. 1)). For the per-CG indication, the indication may be for the CG of the NR SCC (such as whether the cell corresponding to the NR SCC is an MCG or an SCG).

The indication of UE capability on whether it can benefit from reduced power consumption by allowing interruption for measCycleSCell<640 ms. In particular, the procedure 400 may include providing an indication of UE capability of whether the UE can benefit from power consumption by allowing interruption due to deactivated NR SCC measurement for measCycleSCell less than 640 ms. The indication may be per-RAT or per-CG (cell group) indication between network and UE. For example, the indication may be a per-RAT or per-CG provided by a UE to a PCell in the EN-DC network, the NE-DC network, the NR-DC network, or the NR-SA network.

In EN-DC, UE may indicate the capability of "whether it can benefit from reduced power consumption by allowing interruption due to deactivated LTE SCC measurement for measCycleSCell<640 ms" via LTE RRC to LTE PCell if needed. For example, in the EN-DC network, the UE may provide the indication of the UE capability of whether the UE can benefit from power consumption by allowing interruption due to deactivated LTE SCC measurement via LTE RRC signaling to an LTE PCell. UE may indicate the capability of "whether it can benefit from reduced power consumption by allowing interruption due to deactivated NR SCC measurement for measCycleSCell<640 ms" via NR RRC to NR PSCell if needed. For example, in the EN-DC network, the UE may provide the indication of the UE capability of whether the UE can benefit from power consumption by allowing interruption due to deactivated NR SCC measurement via NR RRC signaling to an NR primary cell in a secondary cell group (PSCell). The two indications can be independent signaled from UE to network.

In NE-DC, UE may indicate the capability of "whether it can benefit from reduced power consumption by allowing interruption due to deactivated NR SCC measurement for measCycleSCell<640 ms" via NR RRC to NR PCell if needed. For example, in the NE-DC network, the UE may provide the indication of the UE capability of whether the UE can benefit from power consumption by allowing interruption due to deactivated NR SCC measurement via NR RRC signaling to an NR PCell. UE may indicate the capability of "whether it can benefit from reduced power consumption by allowing interruption due to deactivated LTE SCC measurement for measCycleSCell<640 ms" via LTE RRC to LTE PSCell if needed. For example, in the NE-DC network, the UE may provide the indication of the UE capability of whether the UE can benefit from power consumption by allowing interruption due to deactivated LTE SCC measurement via LTE RRC signaling to an LTE PSCell. the two indications can be independent signaled from UE to network.

In NR-DC and NR-SA, per-UE indication between PCell and UE for all NR operation modes, the UE may indicate this capability via NR RRC to NR PCell. For example, in the NR-DC network and the NR-SA network, the UE may provide the indication of the UE capability of whether the UE can benefit from power consumption by allowing interruption due to deactivated NR SCC measurement via NR RRC signaling to an NR PCell.

The network indication to allow UE have interruption for measCycleSCell<640 ms. For example, the network may provide an indication to the UE indicating whether the UE is allowed to have interruption due to deactivated SCC measurement for measCycleSCell less than 640 ms. The network indication may be a per-RAT or per-CG indication between network and UE.

In EN-DC, LTE PCell may indicate the signaling to UE via LTE RRC to allow UE have interruption due to deactivated LTE SCC measurement for measCycleSCell<640 ms. For example, in the EN-DC network, the LTE PCell may provide the indication of whether the UE is allowed to have the interruption via LTE RRC signaling to the UE in some embodiments. NR PSCell may indicate the signaling to UE via NR RRC to allow UE have interruption due to deactivated NR SCC measurement for measCycleSCell<640 ms. For example, in the EN-DC network, the NR PSCell may provide the indication of whether the UE is allowed to have the interruption via NR RRC signaling to the UE. The two indications can be independent signaled from network to UE In NE-DC, NR PCell may indicate the signaling to UE via NR RRC to allow UE have interruption due to deactivated NR SCC measurement for measCycleSCell<640 ms. For example, in the NE-DC network, the NR PCell may provide the indication of whether the UE is allowed to have the interruption via NR RRC signaling to the UE in some embodiments. LTE PSCell may indicate the signaling to UE via LTE RRC to allow UE have interruption due to deactivated LTE SCC measurement for measCycleSCell<640 ms. For example, in the NE-DC network, the LTE PSCell may provide the indication of whether the UE is allowed to have the interruption via LTE RRC signaling to the UE in some embodiments. The two indications can be independent signaled from network to UE.

In NR-DC and NR-SA, NR PCell may indicate this signaling to UE via NR RRC. For example, in the NE-DC network, the NR-DC network, and the NR-SA network, the NR PCell may provide the indication of whether the UE is allowed to have the interruption via NR RRC signaling to the UE.

The procedure 400 may include providing a first per-RAT or per-CG indication to a base station in 402. In particular, a UE may provide the first per-RAT or per-CG indication to the base station. The per-RAT or per-CG indication may indicate whether the UE can reduce power consumption by allowing interruption due to deactivated SCC measurement for a measCycleSCell that is less than 640 ms.

In some embodiments, the base station may be an LTE base station. The deactivated SCC measurement may be a deactivated LTE SCC measurement in these embodiments. The first per-RAT or per-CG indication may be provided by LTE RRC signaling. In some of these embodiments, the LTE base station may be a master node or a secondary node of an EN-DC network. Accordingly, the UE may provide the first per-RAT or per-CG indication to the master node or the secondary node of the EN-DC. In some of these embodiments, the LTE base station may operate an LTE primary cell in an SCell for the UE. In these embodiments, the LTE base station may be a master node or secondary node of a NE-DC network. Accordingly, the UE may provide the first per-RAT or per-CG indication to the master node or the secondary node of the NE-DC network.

In some embodiments, the base station may be an NR base station. The deactivated SCC measurement may be a deactivated NR SCC measurement in these embodiments. The first per-RAT or per-CG indication may be provided via NR RRC signaling. In some of these embodiments, the base station may be a master node or a secondary node of an NE-DC network, NR-DC network, or an NR-SA network. In some of these embodiments, the NR base station may operate an NR primary cell in an SCell for the UE. In these embodiments, the NR base station may be a master node or a secondary node of an EN-DC network. Accordingly, the UE may provide the first per-RAT or per-CG indication to the master node or the secondary node of the EN-DC network.

The procedure 400 may include identifying a second per-RAT or per-CG indication from the base station in 404. In particular, the base station may provide the second per-RAT or per-CG indication to the UE. The per-RAT or per-CG indication may indicate whether the UE is allowed interruption due to deactivated SCC measurement for a measCycleScell that is less than 640 ms.

In some embodiments, the base station may be an LTE base station and the LTE base station may provide the second per-RAT or per-CG indication via LTE RRC signaling. In some of these embodiments, the LTE base station may be a master node or a secondary node of an EN-DC network. The LTE base station may be an LTE PSCell for the UE in some of these embodiments.

In some embodiments, the base station may be an NR base station and the NR base station may provide the second per-RAT or per-CG indication via NR RRC signaling. In some of these embodiments, the NR base station may be a master node or a secondary node of an NE-DC network, an NR-DC network, or an NR-SA network. The NR base station may be an NR PSCell for the UE in some of these embodiments.

Figure 5:
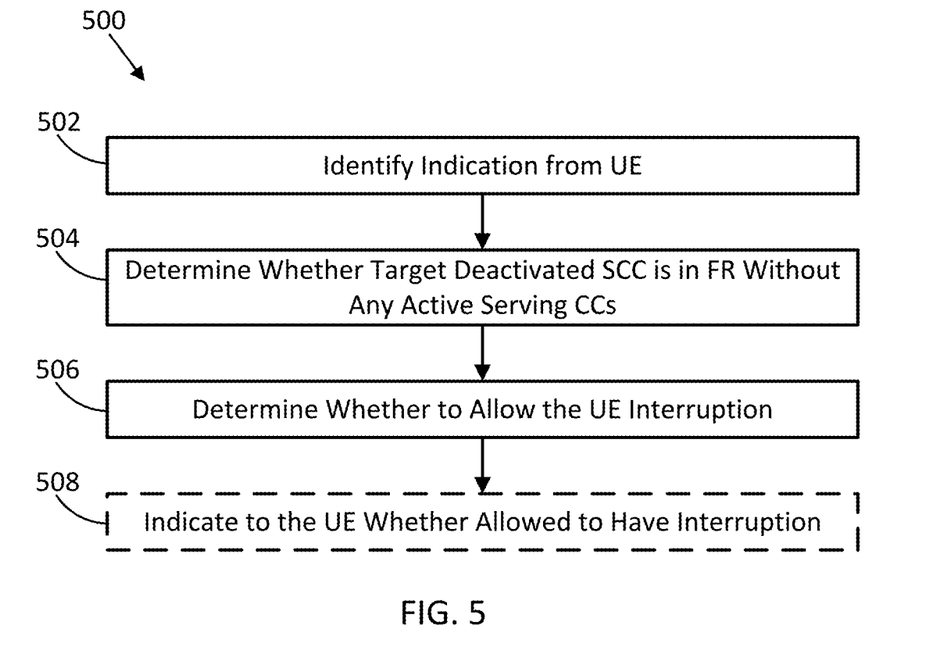
FIG. 5 illustrates an example procedure for an interruption rule when a UE supports per-FR MG in accordance with some embodiments.
Figure 6:
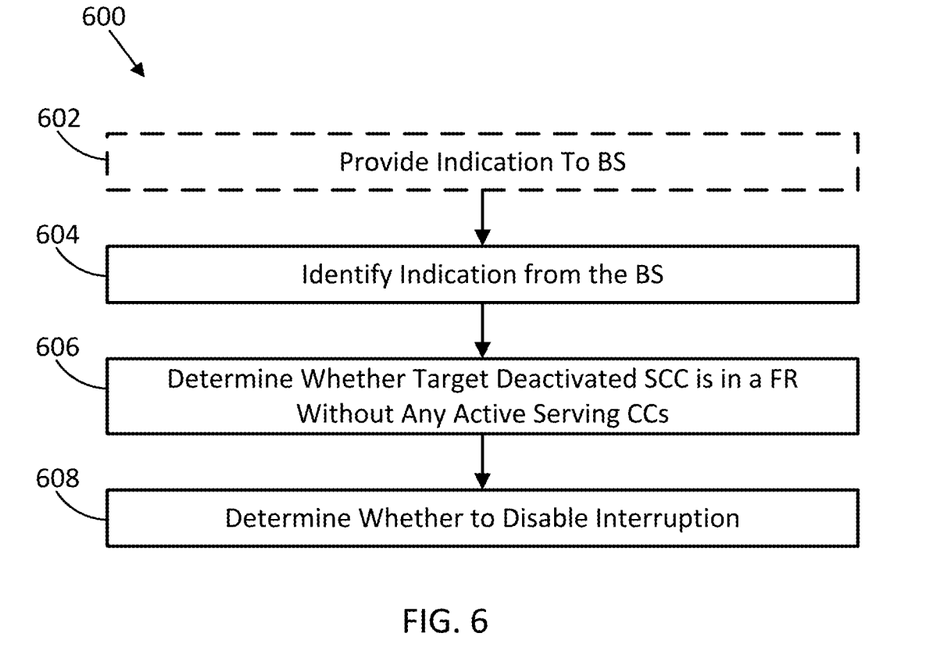
FIG. 6 illustrates another example procedure for an interruption rule when a UE supports per-FR MG.

FIG. 5 illustrates an example procedure 500 for an interruption rule when a UE supports per-FR MG in accordance with some embodiments. The procedure 500 may be performed by a base station (such as the first base station 102 (FIG. 1) or the second base station 104 (FIG. 1)). FIG. 6 illustrates another example procedure 600 for an interruption rule when a UE supports per-FR MG. The procedure 600 may be performed by a UE (such as the UE 110 (FIG. 1)).

An interruption rule when UE supports per-FR MG may be applied. If UE can support per-FR MG, even though UE indicate it can benefit from reduced power consumption by allowing interruption due to deactivated SC measurement for measCycleSCell<640 ms, network may only use this capability when the target deactivated SCC for measurement is in the FR which has at least one active serving CC in some embodiments. The network may not indicate to allow UE have interruption for measCycleSCell<640 ms when the target deactivated SCC for measurement is in the FR which has no any active serving CC, or the network will indicate to not allow UE have interruption for measCycleSCell<640 ms when the target deactivated SCC for measurement is in the FR which has no any active serving CC.

If UE can support per-FR MG, even though the network indicates to allow UE have interruption for measCycleSCell<640 ms, UE may disable this indication to not cause any interruption when the target deactivated SCC for measurement is in the FR which has no any active serving CC in some embodiments.

The procedure 500 may include identifying an indication from a UE in 502. In particular, a base station (such as the first base station 102 (FIG. 1) or the second base station 104 (FIG. 1)) may identify an indication from a UE (such as the UE 110 (FIG. 1)) that the UE can reduce power consumption by allowing interruption due to deactivated NR SCC measurement for measCycleSCell of less than 640 ms. The UE may be a UE that can support per-FR MG.

The procedure 500 may include determining whether a target deactivated is in FR without any active serving CCs in 504. In particular, the base station may determine whether the target deactivated SCC for the deactivated SCC measurement is in a FR without any active serving CCs.

The procedure 500 may include determining whether to allow the UE interruption in 506. In particular, the base station may determine whether to allow the UE the interruption based on the determination whether the target deactivated SCC is in a FR without any active serving CCs from 504. The base station may determine not to allow the UE the interruption in response to determining the target deactivated SCC is in a FR without any active serving CCs. Otherwise, the base station may determine to allow the UE the interruption.

The procedure 500 may include indicating to the UE whether the UE is allowed to have the interruption in 508. In particular, the base station may indicate to the UE whether it is allowed to have the interruption based on the determination from 506. For example, the base station may indicate that the base station is not allowed to have the interruption in response to determining not to allow the UE the interruption in 506. In other embodiments, the base station may ignore the indication from the UE in response to determining not to allow the UE the interruption in 506 and an indication may not be sent to the UE. The base station may provide an indication that the base station is allowed to have the interruption in response to determining to all the UE the interruption in 506. In other embodiments, 508 may be omitted.

The procedure 600 may include providing an indication to a base station in 602. In particular, the UE may provide an indication to a base station of a RAN whether the UE can benefit from an interruption. In some instances, the indication may indicate that the UE can benefit from the interruption. The UE may be a UE that can support per-FR MG. In some embodiments, 602 may be omitted.

The procedure 600 may include identifying an indication from a base station in 604. In particular, the UE may identify an indication from the base station that indicates that the UE is allowed to have interruption due to deactivated SCC measurement for measCycleSCell of less than 640 ms.

The procedure 600 may include determining whether a target deactivated SCC is in a FR without any active service CCs in 606. In particular, the UE may determine whether the target deactivated SCC for deactivated SCC measurement is in a FR without any active serving CCs. In some instances, the UE may determine that the target deactivated SCC for deactivated SCC measurement is in a FR without any active serving CCs.

The procedure 600 may include determining whether to disable interruption in 608. In particular, the UE may determine whether to disable the interruption for the target deactivated SCC based on the determination whether the target deactivated SCC is in a FR without any active serving CCs. The UE may determine to disable the interruption for the target deactivated SCC in response to determining the target deactivated SCC is in a FR without any active serving CCs. The UE may disable the interruption based on the determination and will not allow interruption regardless of the indication received from the base station.

FIG. 7 illustrates an example UE 700 in accordance with some embodiments. The UE 700 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices. In some embodiments, the UE 700 may be a RedCap UE or NR-Light UE.

The UE 700 may include processors 704, RF interface circuitry 708, memory/storage 712, user interface 716, sensors 720, driver circuitry 722, power management integrated circuit (PMIC) 724, antenna structure 726, and battery 728. The components of the UE 700 may be implemented as integrated circuits (ICs), portions thereof, discrete electronic devices, or other modules, logic, hardware, software, firmware, or a combination thereof. The block diagram of FIG. 7 is intended to show a high-level view of some of the components of the UE 700. However, some of the components shown may be omitted, additional components may be present, and different arrangement of the components shown may occur in other implementations.

The components of the UE 700 may be coupled with various other components over one or more interconnects 732, which may represent any type of interface, input/output, bus (local, system, or expansion), transmission line, trace, optical connection, etc. that allows various circuit components (on common or different chips or chipsets) to interact with one another.

The processors 704 may include processor circuitry such as, for example, baseband processor circuitry (BB) 704A, central processor unit circuitry (CPU) 704B, and graphics processor unit circuitry (GPU) 704C. The processors 704 may include any type of circuitry or processor circuitry that executes or otherwise operates computer-executable instructions, such as program code, software modules, or functional processes from memory/storage 712 to cause the UE 700 to perform operations as described herein.

In some embodiments, the baseband processor circuitry 704A may access a communication protocol stack 736 in the memory/storage 712 to communicate over a 3GPP compatible network. In general, the baseband processor circuitry 704A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 708.

The baseband processor circuitry 704A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 712 may include one or more non-transitory, computer-readable media that includes instructions (for example, communication protocol stack 736) that may be executed by one or more of the processors 704 to cause the UE 700 to perform various operations described herein. The memory/storage 712 include any type of volatile or non-volatile memory that may be distributed throughout the UE 700. In some embodiments, some of the memory/storage 712 may be located on the processors 704 themselves (for example, L1 and L2 cache), while other memory/storage 712 is external to the processors 704 but accessible thereto via a memory interface. The memory/storage 712 may include any suitable volatile or non-volatile memory such as, but not limited to, dynamic random access memory (DRAM), static random access memory (SRAM), eraseable programmable read only memory (EPROM), electrically eraseable programmable read only memory (EEPROM), Flash memory, solid-state memory, or any other type of memory device technology.

The RF interface circuitry 708 may include transceiver circuitry and radio frequency front module (RFEM) that allows the UE 700 to communicate with other devices over a radio access network. The RF interface circuitry 708 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 726 and proceed to filter and amplify (with a low-noise amplifier) the signal. The signal may be provided to a receiver of the transceiver that down-converts the RF signal into a baseband signal that is provided to the baseband processor of the processors 704.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 726.

In various embodiments, the RF interface circuitry 708 may be configured to transmit/receive signals in a manner compatible with NR access technologies.

The antenna 726 may include antenna elements to convert electrical signals into radio waves to travel through the air and to convert received radio waves into electrical signals. The antenna elements may be arranged into one or more antenna panels. The antenna 726 may have antenna panels that are omnidirectional, directional, or a combination thereof to enable beamforming and multiple input, multiple output communications. The antenna 726 may include microstrip antennas, printed antennas fabricated on the surface of one or more printed circuit boards, patch antennas, phased array antennas, etc. The antenna 726 may have one or more panels designed for specific frequency bands including bands in FR1 or FR2.

The user interface circuitry 716 includes various input/output (I/O) devices designed to enable user interaction with the UE 700. The user interface 716 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 700.

The sensors 720 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 722 may include software and hardware elements that operate to control particular devices that are embedded in the UE 700, attached to the UE 700, or otherwise communicatively coupled with the UE 700. The driver circuitry 722 may include individual drivers allowing other components to interact with or control various input/output (I/O) devices that may be present within, or connected to, the UE 700. For example, driver circuitry 722 may include a display driver to control and allow access to a display device, a touchscreen driver to control and allow access to a touchscreen interface, sensor drivers to obtain sensor readings of sensor circuitry 720 and control and allow access to sensor circuitry 720, drivers to obtain actuator positions of electro-mechanic components or control and allow access to the electro-mechanic components, a camera driver to control and allow access to an embedded image capture device, audio drivers to control and allow access to one or more audio devices.

The PMIC 724 may manage power provided to various components of the UE 700. In particular, with respect to the processors 704, the PMIC 724 may control power-source selection, voltage scaling, battery charging, or DC-to-DC conversion.

In some embodiments, the PMIC 724 may control, or otherwise be part of, various power saving mechanisms of the UE 700. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 700 may power down for brief intervals of time and thus save power. If there is no data traffic activity for an extended period of time, then the UE 700 may transition off to an RRC Idle state, where it disconnects from the network and does not perform operations such as channel quality feedback, handover, etc. The UE 700 goes into a very low power state and it performs paging where again it periodically wakes up to listen to the network and then powers down again. The UE 700 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 728 may power the UE 700, although in some examples the UE 700 may be mounted deployed in a fixed location, and may have a power supply coupled to an electrical grid. The battery 728 may be a lithium ion battery, a metal-air battery, such as a zinc-air battery, an aluminum-air battery, a lithium-air battery, and the like. In some implementations, such as in vehicle-based applications, the battery 728 may be a typical lead-acid automotive battery.

Figure 8:
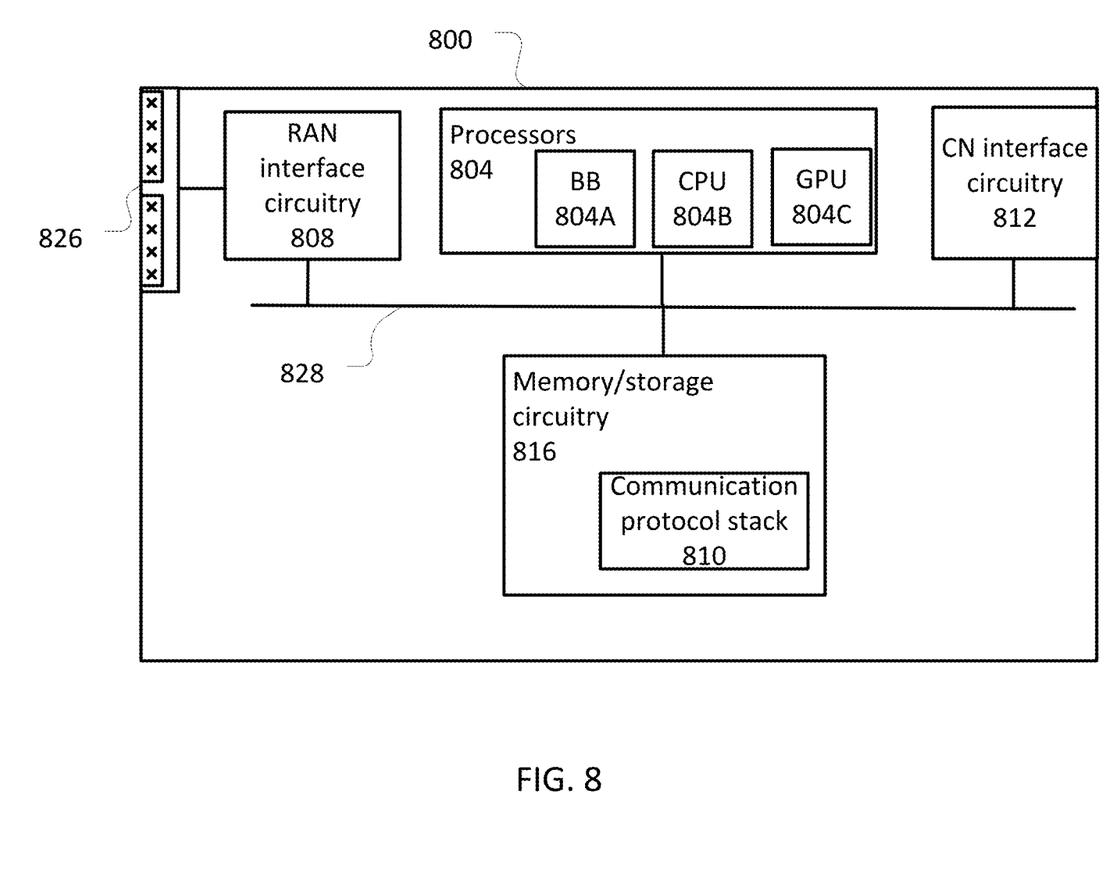
FIG. 8 illustrates an example gNB in accordance with some embodiments.

FIG. 8 illustrates an example gNB 800 in accordance with some embodiments. The gNB 800 may include processors 804, RF interface circuitry 808, core network (CN) interface circuitry 812, memory/storage circuitry 816, and antenna structure 826.

The components of the gNB 800 may be coupled with various other components over one or more interconnects 828.

The processors 804, RF interface circuitry 808, memory/storage circuitry 816 (including communication protocol stack 810), antenna structure 826, and interconnects 828 may be similar to like-named elements shown and described with respect to FIG. 7.

The CN interface circuitry 812 may provide connectivity to a core network, for example, a 5th Generation Core network (5GC) using a 5GC-compatible network interface protocol such as carrier Ethernet protocols, or some other suitable protocol. Network connectivity may be provided to/from the gNB 800 via a fiber optic or wireless backhaul. The CN interface circuitry 812 may include one or more dedicated processors or FPGAs to communicate using one or more of the aforementioned protocols. In some implementations, the CN interface circuitry 812 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 may include one or more computer-readable media having instructions that, when executed by one or more processors, cause a user equipment (UE) to provide, to a base station (BS) of a radio access network (RAN), a first indication of whether the UE can reduce power consumption by allowing interruption due to deactivated new radio (NR) secondary component carrier (SCC) measurement for a secondary cell measurement cycle (measCycleSCell) that is less than 640 milliseconds (ms), and determine whether to allow the interruption based on a second indication received from the BS.

Example 2 may include the one or more computer-readable media of example 1, wherein the first indication and the second indication are per-UE indications.

Example 3 may include the one or more computer-readable media of example 2, wherein the BS is a master node (MN), and wherein the first indication and the second indication are provided by LTE radio resource control (RRC) signaling.

Example 4 may include the one or more computer-readable media of example 3, wherein the UE is to provide the first indication to the MN of an evolved universal terrestrial radio access network NR dual connectivity (EN-DC) network.

Example 5 may include the one or more computer-readable media of example 2, wherein the BS is a master node (MN), and wherein the first indication and the second indication are provided by NR radio resource control (RRC) signaling.

Example 6 may include the one or more computer-readable media of example 5, wherein the UE is to provide the first indication to the MN of an NR-evolved universal terrestrial radio access network dual connectivity (NE-DC) network, an NR dual connectivity (NR-DC) network, or an NR standalone (NR-SA) network.

Example 7 may include one or more computer-readable media having instructions that, when executed by one or more processors, cause a user equipment (UE) to provide, to a base station (BS) of a radio access network (RAN), a first per-radio access technology (RAT) or per-cell group (CG) indication of whether the UE can reduce power consumption by allowing interruption due to deactivated new radio (NR) secondary component carrier (SCC) measurement for a secondary cell measurement cycle (measCycleSCell) that is less than 640 milliseconds (ms), and identify a second per-RAT or per-CG indication received from the BS of whether the interruption is allowed.

Example 8 may include the one or more computer-readable media of example 7, wherein the BS is a long term evolution (LTE) BS, wherein the deactivated SCC measurement is a deactivated LTE SCC measurement, and wherein the first per-RAT or per-CG indication and the second per-RAT or per-CG indication are provided via LTE radio resource control (RRC) signaling.

Example 9 may include the one or more computer-readable media of example 8, wherein the UE is to provide the first per-RAT or per-CG indication to a master node or secondary node of an evolved universal terrestrial radio access network NR dual connectivity (EN-DC) network.

Example 10 may include the one or more computer-readable media of example 8, wherein the LTE BS is to operate an LTE primary cell in a secondary cell group (PSCell) for the UE.

Example 11 may include the one or more computer-readable media of example 10, wherein the UE is to provide the first per-RAT or per-CG indication to a master node or secondary node of a NR evolved universal terrestrial radio access network dual connectivity (NE-DC) network.

Example 12 may include the one or more computer-readable media of example 7, wherein the BS is a new radio (NR) BS, wherein the deactivated SCC measurement is a deactivated NR SCC measurement, and wherein the first per-RAT or per-CG indication and the second per-RAT or per-CG indication are provided via NR radio resource control (RRC) signaling.

Example 13 may include the one or more computer-readable media of example 12, wherein the UE is to provide the first per-RAT or per-CG indication to a master node or secondary node of an NR evolved universal terrestrial radio access network dual connectivity (NE-DC) network, an NR dual connectivity (NR-DC) network, or an NR standalone (NR-SA) network.

Example 14 may include the one or more computer-readable media of example 12, wherein the NR BS is to operate an NR primary cell in a secondary cell group (PSCell) for the UE.

Example 15 may include the one or more computer-readable media of example 14, wherein the UE is to provide the first per-RAT or per-CG indication to a master node or secondary node of an evolved universal terrestrial radio access network NR dual connectivity (EN-DC) network.

Example 16 may include one or more computer-readable media having instructions that, when executed by one or more processors, cause a base station (BS) to identify an indication from a user equipment (UE) that can support per-frequency range (FR) measurement gap (MG) that the UE can reduce power consumption by allowing interruption due to deactivated new radio (NR) secondary component carrier (SCC) measurement for a secondary cell measurement cycle (measCycleSCell) of less than 640 milliseconds (ms), determine whether a target deactivated SCC for the deactivated SCC measurement is in a FR without any active serving component carriers (CCs), and determine whether to allow the UE the interruption based on the determination whether the target deactivated SCC is in a FR without any active serving CCs.

Example 17 may include the one or more computer-readable media of example 16, wherein the BS is to determine not to allow the UE the interruption in response to determining the target deactivated SCC is in a FR without any active serving CCs.

Example 18 may include the one or more computer-readable media of example 17, wherein the instructions, when executed by the one or more processors, further cause the BS to indicate to the UE that the UE is not allowed to have the interruption.

Example 19 may include the one or more computer-readable media of example 18, wherein the BS is to ignore the indication that the UE can reduce power consumption by allowing interruption.

Example 20 may include the one or more computer-readable media of example 17, wherein the BS is to determine to allow the UE the interruption in response to determining the target deactivated SCC is in a FR with at least one active serving CC, and wherein the instructions, when executed by the one or more processors, further cause the BS to provide an indication to the UE that the UE is allowed to have the interruption.

Example 21 may include one or more computer-readable media having instructions that, when executed by one or more processors, cause a user equipment (UE) that can support per-frequency range (FR) measurement gap (MG) to identify an indication from a base station (BS) of a radio access network (RAN) that indicates that the UE is allowed to have interruption due to deactivated secondary component carrier (SCC) measurement for a second cell measurement cycle (measCycleSCell) of less than 640 milliseconds (ms), determine that a target deactivated SCC for deactivated SCC measurement is in a frequency range (FR) without any active serving component carriers (CCs), and determine whether to disable the interruption for the target deactivated SCC based on the determination whether the target deactivated SCC is in a FR without any active serving CCs.

Example 22 may include the one or more computer-readable media of example 21, wherein the UE is to determine to disable the interruption for the target deactivated SCC in response to determining the target deactivated SCC is in a FR without any active serving CCs.

Example 23 may include the one or more computer-readable media of example 21, wherein the indication is a first indication, wherein the instructions, when executed by the one or more processors, further cause the UE to provide a second indication to the base station that the UE can benefit from the interruption, wherein the first indication is provided in response to the second indication.

Example 24 may include a user equipment (UE) comprising one or more antennas to communicate with a base station (BS) of a radio access network (RAN), processing circuitry coupled with the one or more antennas, the processing circuitry to provide, to the BS, a first per-radio access technology (RAT) or per-cell group (CG) indication of whether the UE can reduce power consumption by allowing interruption due to deactivated new radio (NR) secondary component carrier (SCC) measurement for a secondary cell measurement cycle (measCycleSCell) that is less than 640 milliseconds (ms), and identify a second per-RAT or per-CG indication received from the BS of whether the interruption is allowed.

Example 25 may include the UE of example 24, wherein the BS is a long term evolution (LTE) BS, wherein the deactivated SCC measurement is a deactivated LTE SCC measurement, and wherein the first per-RAT or per-CG indication and the second per-RAT or per-CG indication are provided via LTE radio resource control (RRC) signaling.

Example 26 may include the UE of example 25, wherein the LTE BS is to operate a primary cell in a master cell group (PCell) for the UE.

Example 27 may include the UE of example 26, wherein the processing circuitry is to provide the first per-RAT or per-CG indication to a master node of an evolved universal terrestrial radio access network NR dual connectivity (EN-DC) network.

Example 28 may include the UE of example 25, wherein the LTE BS is to operate a primary cell in a secondary cell group (PSCell) for the UE.

Example 29 may include the UE of example 28, wherein the processing circuitry is to provide the first per-RAT or per-CG indication to a secondary node of a NR evolved universal terrestrial radio access network dual connectivity (NE-DC) network.

Example 30 may include the UE of example 24, wherein the BS is a new radio (NR) BS, wherein the deactivated SCC measurement is a deactivated NR SCC measurement, and wherein the first per-RAT or per-CG indication and the second per-RAT or per-CG indication are provided via NR radio resource control (RRC) signaling.

Example 31 may include the UE of example 30, wherein the NR BS is to operate a primary cell in a master cell group (PCell) for the UE.

Example 32 may include the UE of example 30, wherein the NR BS is a master node (MN), wherein the processing circuitry is to provide the first per-RAT or per-CG indication to the master node of an NR evolved universal terrestrial radio access network dual connectivity (NE-DC) network, an NR dual connectivity (NR-DC) network, or an NR standalone (NR-SA) network.

Example 33 may include the UE of example 30, wherein the NR BS is to operate a primary cell in a secondary cell group (PSCell) for the UE.

Example 34 may include the UE of example 33, wherein the processing circuitry is to provide the first per-RAT or per-CG indication to a secondary node of an EN-DC.

Example 35 may include a method for operating a user equipment (UE) that can support per-frequency range (FR) measurement gap (MG) comprising identifying an indication from a base station (BS) of a radio access network (RAN) that indicates that the UE is allowed to have interruption due to deactivated secondary component carrier (SCC) measurement for a second cell measurement cycle (measCycleSCell) of less than 640 milliseconds (ms), determining that a target deactivated SCC for deactivated SCC measurement is in a frequency range (FR) without any active serving component carriers (CCs), and determining whether to disable the interruption for the target deactivated SCC based on the determination whether the target deactivated SCC is in a FR without any active serving CCs.

Example 36 may include the method of example 35, wherein the UE is to determine to disable the interruption for the target deactivated SCC in response to determining the target deactivated SCC is in a FR without any active serving CCs.

Example 37 may include the method of example 35, wherein the indication is a first indication, wherein the method further comprises providing a second indication to the base station that the UE can benefit from reduced power consumption by allowing the interruption, wherein the first indication is provided in response to the second indication.

Example 38 may include a method comprising performance of the operations of any of examples 1-37.

Example 39 may include an apparatus comprising means to perform one or more elements of any of examples 1-37.

Example 40 may include a signal as described in or related to any of examples 1-37, or portions or parts thereof.

Example 41 may include a datagram, information element, packet, frame, segment, PDU, or message as described in or related to any of examples 1-37, or portions or parts thereof, or otherwise described in the present disclosure.

Example 42 may include a signal encoded with data as described in or related to any of examples 1-37, or portions or parts thereof, or otherwise described in the present disclosure.

Example 43 may include a signal encoded with a datagram, IE, packet, frame, segment, PDU, or message as described in or related to any of examples 1-37, or portions or parts thereof, or otherwise described in the present disclosure.

Example 44 may include an electromagnetic signal carrying computer-readable instructions, wherein execution of the computer-readable instructions by one or more processors is to cause the one or more processors to perform the method, techniques, or process as described in or related to any of examples 1-37, or portions thereof.

Example 45 may include a signal in a wireless network as shown and described herein.

Example 46 may include a method of communicating in a wireless network as shown and described herein.

Example 47 may include a system for providing wireless communication as shown and described herein.

Example 48 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory computer-readable media having instructions that, when executed by one or more processors, cause a device to:
generate a signal, to be sent to a base station (B S) of a radio access network (RAN), with a first indication of whether the device can reduce power consumption by allowing interruption due to deactivated new radio (NR) secondary component carrier (SCC) measurement for a secondary cell measurement cycle (measCycleSCell) that is less than 640 milliseconds (ms), wherein the device can support per-frequency range (FR) measurement gaps (MGs); and
determine whether to allow the interruption based on a second indication received from the BS, wherein the second indication depends on whether a target deactivated SCC for the deactivated NR SCC measurement is in an FR without any active serving component carriers (CCs).

2. The one or more non-transitory computer-readable media of claim 1, wherein the first indication and the second indication are per-device indications.

3. The one or more non-transitory computer-readable media of claim 2, wherein the BS is a master node (MN), and wherein the first indication and the second indication are provided by long term evolution (LTE) radio resource control (RRC) signaling.

4. The one or more non-transitory computer-readable media of claim 3, wherein the device is to provide the first indication to the MN of an evolved universal terrestrial radio access network NR dual connectivity (EN-DC) network.

5. The one or more non-transitory computer-readable media of claim 2, wherein the BS is a master node (MN) and wherein the first indication and the second indication are provided by NR radio resource control (RRC) signaling.

6. The one or more non-transitory computer-readable media of claim 5, wherein the device is to send the signal with the first indication to the master node of an NR-evolved universal terrestrial radio access network dual connectivity (NE-DC) network, an NR dual connectivity (NR-DC) network, or an NR standalone (NR-SA) network.

7. A user equipment (UE) comprising:
one or more antennas to communicate with a long term evolution (LTE) base station (BS) of a radio access network (RAN);
processing circuitry coupled with the one or more antennas, the processing circuitry to:
generate a signal, to be sent to the LTE BS, with a first per-radio access technology (RAT) or per-cell group (CG) indication of whether the UE can reduce power consumption by allowing interruption due to deactivated new radio (NR) secondary component carrier (SCC) measurement for a secondary cell measurement cycle (measCycleSCell) that is less than 640 milliseconds (ms), wherein the LTE BS is to operate a primary cell in a secondary cell group (PSCell) for the UE; and
identify a second per-RAT or per-CG indication received from the BS of whether the interruption is allowed, wherein the first per-RAT or per-CG indication and the second per-RAT or second per-CG indication are provided via LTE radio resource control (RRC) signaling.

8. The UE of claim 7, wherein the LTE BS is to operate a primary cell in a master cell group (PCell) for the UE.

9. The UE of claim 8, wherein the processing circuitry is to send the signal with the first per-RAT or per-CG indication to a master node of an evolved universal terrestrial radio access network NR dual connectivity (EN-DC) network.

10. The UE of claim 7, wherein the processing circuitry is to provide the first per-RAT or per-CG indication to a secondary node of an NR evolved universal terrestrial radio access network dual connectivity (NE-DC) network.

11. The UE of claim 7, wherein signal with the first per-RAT or per-CG indication and the second per-RAT or per-CG indication are sent via NR radio resource control (RRC) signaling.

12. The UE of claim 11, wherein the LTE BS is to operate a primary cell in a master cell group (PCell) for the UE.

13. The UE of claim 11, wherein the LTE BS is a master node (MN), wherein the processing circuitry is to send the signal with the first per-RAT or per-CG indication to the master node of an NR evolved universal terrestrial radio access network dual connectivity (NE-DC) network, an NR dual connectivity (NR-DC) network, or an NR standalone (NR-SA) network.

14. One or more non-transitory computer-readable media having instructions that, when executed by one or more processors, cause a base station (BS) to:
identify an indication from a user equipment (UE) that can support per-frequency range (FR) measurement gap (MG) that the UE can reduce power consumption by allowing interruption due to deactivated new radio (NR) secondary component carrier (SCC) measurement for a secondary cell measurement cycle (measCycleSCell) of less than 640 milliseconds (ms);
determine whether a target deactivated SCC for the deactivated SCC measurement is in a FR without any active serving component carriers (CCs); and
determine whether to allow the UE the interruption based on the determination whether the target deactivated SCC is in a FR without any active serving CCs.

15. The one or more non-transitory computer-readable media of claim 14, wherein the BS is to determine not to allow the UE the interruption in response to determining the target deactivated SCC is in a FR without any active serving CCs.

16. The one or more non-transitory computer-readable media of claim 15, wherein the instructions, when executed by the one or more processors, further cause the BS to indicate to the UE that the UE is not allowed to have the interruption.

17. The one or more non-transitory computer-readable media of claim 15, wherein the BS is to ignore the indication from the UE that the UE can reduce power consumption by allowing interruption.

18. The one or more non-transitory computer-readable media of claim 14, wherein the BS is to determine to allow the UE the interruption in response to determining the target deactivated SCC is in a FR with at least one active serving CC, and wherein the instructions, when executed by the one or more processors, further cause the BS to provide an indication to the UE that the UE is allowed to have the interruption.

* * * * *